United States Patent
Fetz et al.

(10) Patent No.: US 9,502,887 B2
(45) Date of Patent: Nov. 22, 2016

(54) MEASURING SYSTEM HAVING AT LEAST ONE FIELD DEVICE WITH AT LEAST ONE DISPLAY APPARATUS AS WELL AS METHOD FOR OPERATING SAME

(71) Applicant: Endress + Hauser Conducta Gesellschaft für Mess- und Regeltechnik mbH + Co. KG, Gerlingen (DE)

(72) Inventors: Florian Fetz, Stuttgart (DE); Martin Lohmann, Gerlingen (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 57 days.

(21) Appl. No.: 14/294,365

(22) Filed: Jun. 3, 2014

(65) Prior Publication Data

US 2014/0362487 A1 Dec. 11, 2014

(30) Foreign Application Priority Data

Jun. 10, 2013 (DE) .......... 10 2013 105 994

(51) Int. Cl.
*H02H 3/24* (2006.01)
*H02H 7/20* (2006.01)
*G05B 9/02* (2006.01)
*G01D 3/08* (2006.01)

(52) U.S. Cl.
CPC .......... *H02H 7/20* (2013.01); *G01D 3/08* (2013.01); *G05B 9/02* (2013.01)

(58) Field of Classification Search
USPC .......................................................... 361/92
See application file for complete search history.

(56) References Cited

U.S. PATENT DOCUMENTS

| 6,774,786 B1* | 8/2004 | Havekost ........... G05B 23/0272 340/500 |
| 7,280,892 B2* | 10/2007 | Bavel ...................... A01G 7/00 239/69 |
| 8,898,498 B2 | 11/2014 | Seiler |
| 9,124,096 B2* | 9/2015 | Johnson ................ H02H 3/202 |
| 2002/0055790 A1* | 5/2002 | Havekost ............. G05B 23/027 700/80 |
| 2002/0064011 A1* | 5/2002 | Loechner .......... G05B 19/0428 361/92 |

(Continued)

FOREIGN PATENT DOCUMENTS

| CN | 1210292 A | 3/1999 |
| CN | 102087511 A | 6/2011 |

(Continued)

OTHER PUBLICATIONS

German Search Report, German PTO, Munich, Dec. 20, 2013.

*Primary Examiner* — Ronald W Leja
(74) *Attorney, Agent, or Firm* — Christopher R. Powers; PatServe

(57) ABSTRACT

A measuring system having at least one field device with at least one display apparatus, wherein the display apparatus is embodied for displaying data, information and diagnostic reports of the field device, wherein the field device is supplied with voltage via a voltage input. A monitoring system is provided, which monitors the voltage at the voltage input and recognizes a voltage reduction, and the field device is embodied to execute a service program, which performs steps to shut down the field device in the case of a detected voltage reduction, characterized in that the service program is embodied, in the case of a detected voltage reduction, to show on the display apparatus a diagnostic report, which describes the state of the field device. The invention relates further to a method for operating the measuring system.

7 Claims, 1 Drawing Sheet

(56) References Cited

U.S. PATENT DOCUMENTS

| | | | | |
|---|---|---|---|---|
| 2005/0109395 | A1* | 5/2005 | Seberger | G05B 9/02 137/8 |
| 2006/0148410 | A1* | 7/2006 | Nelson | G01D 3/08 455/67.11 |
| 2007/0286617 | A1* | 12/2007 | Tanaka | G03G 15/0863 399/30 |
| 2008/0081579 | A1* | 4/2008 | Chen | H04W 4/00 455/187.1 |
| 2011/0131455 | A1* | 6/2011 | Law | H04B 3/548 714/40 |
| 2012/0035749 | A1* | 2/2012 | Schleiss | G05B 19/0428 700/79 |
| 2012/0262298 | A1* | 10/2012 | Bohm | G01N 27/3274 340/604 |
| 2012/0296483 | A1 | 11/2012 | Seiler | |
| 2013/0179697 | A1* | 7/2013 | Nicholas | G06F 1/30 713/300 |
| 2013/0227575 | A1* | 8/2013 | Jensen | G05B 23/0256 718/102 |
| 2014/0024956 | A1* | 1/2014 | Purdy | A61B 5/02154 600/488 |
| 2014/0049868 | A1* | 2/2014 | Seberger | H02H 9/02 361/90 |

FOREIGN PATENT DOCUMENTS

| | | |
|---|---|---|
| DE | 102007062919 A1 | 6/2009 |
| DE | 102009047538 A1 | 6/2011 |
| DE | 102009047542 A1 | 6/2011 |

\* cited by examiner

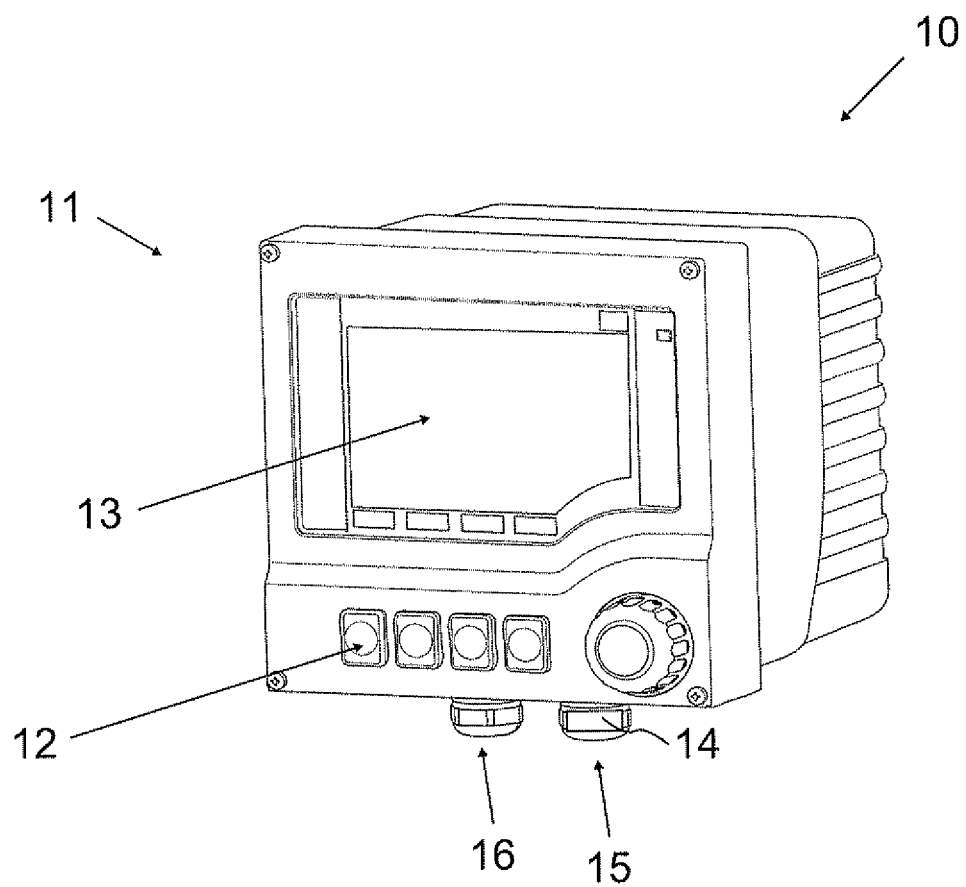

MEASURING SYSTEM HAVING AT LEAST ONE FIELD DEVICE WITH AT LEAST ONE DISPLAY APPARATUS AS WELL AS METHOD FOR OPERATING SAME

TECHNICAL FIELD

The invention relates to a measuring system having at least one field device with at least one display apparatus. The invention relates further to a method for operating the same.

BACKGROUND DISCUSSION

Field devices are technical systems applied in automation technology and have a direct relationship with a production process. The term "field" refers in automation technology and in process automation to the area outside of circuit cabinets, respectively control stations. Field devices include, in such case, both actuators (control elements, valves, etc.), sensors (pH, temperature, conductivity, turbidity, etc.) as well as also measurement transmitters.

Modern field devices employ a monitoring of their external voltage supply. This can be implemented in hardware, for instance, by a reset generator, and/or by a voltage monitoring in software. When at the field device a reduction of the external supply voltage is detected, the system is shut down and possibly present energy buffers are disconnected. After decay of the remaining energy in the electronics, the device switches off, respectively drops out, due to the lacking of energy supply.

A fluctuating voltage supply or EMC influences can lead to a voltage loss being recognized, although none is present. As a result thereof, the system either shuts down and executes an immediate restart or the system remains showing the last content of the display unit stand, since the residual energy never drained from the electronics.

The first behavior looks to the user like an intermittent problem with the device, while the latter equals a "frozen" measured value on the display unit, i.e. subsequent changes of the measured value are no longer displayed. The user has, in this case, no diagnostic opportunities for detecting the cause of the malfunction. This malfunctioning is possibly first noticed only after some time, since the user has no reason to think the "frozen" display is a malfunction. While it is true that, in this case, most often no erroneous measurement data is transmitted to a, in given cases, present control station, nevertheless an error on the display unit cannot be detected.

SUMMARY OF THE INVENTION

An object of the invention is to provide the user with an opportunity independently to detect the cause of the malfunction, thus a defective voltage supply, in order to be able to introduce suitable curative measures.

The object is achieved by a measuring system having at least one field device with at least one display apparatus; wherein the display apparatus is embodied for displaying data, information and diagnostic reports of the field device; wherein the field device is supplied with voltage via a voltage input; wherein a monitoring system is provided, which monitors the voltage at the voltage input and recognizes a voltage reduction; and wherein the field device is embodied to execute a service program, which performs steps to shut down the field device in the case of a detected voltage reduction. The measuring system is characterized in that the service program is embodied, in the case of a detected voltage reduction, to show on the display apparatus a diagnostic report, which describes the state of the field device.

Possible steps for shut down of the system include at least securing memory, persisting data and settings, turning off interrupts and/or deactivating the energy buffer. If now there is a fluctuation of the voltage supply, which leads to a voltage reduction, then one or more of these steps is/are executed by the service program in the measuring system, respectively field device. In order that the user can easily recognize such a voltage reduction, there is displayed on the display apparatus, as a last step, a diagnostic report, which describes the state of the field device. A diagnostic report reads, for example, "Please check voltage supply".

If the voltage reduction was an actual voltage reduction, after the shut down a restart is executed and the diagnostic report is not displayed before the shut down (energy storer was already empty) or it is displayed only for a short time (energy storer empties during display of the diagnostic report).

If the voltage reduction was a false voltage reduction, then displayed on the display apparatus is the diagnostic report, and a user can immediately recognize the error. The error is, thus, directly recognizable on-site.

In an advantageous embodiment, the field device includes at least one signal output and the service program is embodied, in the case of a detected voltage reduction, to output an error signal, especially an error current, on the signal output. In this way, also at a correspondingly matched location—in given cases, widely removed from the measuring system—, for instance, at a control station, the measuring system error can be recognized and appropriately handled.

Preferably, the field device is an actuator, sensor or measurement transmitter.

In an advantageous embodiment, the field device is a multi-parameter field device.

In a preferred further development, the display apparatus is mounted on the field device. If the field device is, for instance, a measurement transmitter, the diagnostic report is displayed directly on the display there.

Alternatively, the display apparatus is embodied as a computer, laptop, handheld, smart phone or tablet-PC. The user or service technician can, thus, use devices, which are usually brought along.

The object is further achieved by a method for operating a measuring system as above described. The method includes steps as follows: detecting a voltage reduction at the voltage input; performing steps for shut down of the field device; and displaying a diagnostic report, which describes the state of the field device.

In an advantageous embodiment, the method further includes a step as follows: outputting an error signal, especially an error current, on the signal output. If the field device is embodied, for instance, as a two conductor device, an error current can be sent to the control station.

BRIEF DESCRIPTION OF THE DRAWING

The invention will now be explained in greater detail based on the drawing, the sole FIGURE of which shows as follows:

FIG. 1 is a measuring system of the invention embodied as a measurement transmitter.

DETAILED DISCUSSION IN CONJUNCTION WITH THE DRAWINGS

The measuring system of the invention in its totality bears the reference character 10 and is shown in FIG. 1.

The measuring system 10 is composed of at least one field device 11 having an input system 12 and a display apparatus 13.

A field device 11 in the sense of this invention is a technical system for application in automation technology, wherein, for example, an actuator (control element, valve, etc.), sensor (pH, temperature, conductivity, turbidity, etc.) or a measurement transmitter is meant.

In the example, the field device 11, see FIG. 1, is embodied as a measurement transmitter with connected sensor (not shown).

The field device 11 has an input system 12 and at least one display apparatus 13. The input system 12 serves for setting all possible parameters. As presented, the input system 12 can be implemented by toggle switches, buttons, etc. Also, the display can be embodied as a touch display. Alternatively or supplementally, a computer, laptop, handheld, smart phone, tablet-PC or the like can be connected.

The field device 11 requires a voltage supply. Located at the voltage input 15 is a monitoring system 14 for monitoring the external voltage supply. If the monitoring system 14 detects a voltage reduction, steps for shut down of the field device 11 are executed. Such steps can include: saving memories, persisting data and settings, turning off interrupts and/or deactivating the energy buffer.

In order that the user can easily recognize such a voltage reduction, there is displayed on the display apparatus 13, as a last step, a diagnostic report, which describes the state of the field device 11. A diagnostic report is, thus, also to be considered an error report. In general, in the sense used here, a diagnostic report means generically all indications and error reports. A diagnostic report includes, for example, messages such as, "Please check voltage supply". It is, thus, possible for a user to recognize directly on-site the error state of the field device 11.

The field device 11 is embodied as a two, or four, conductor device. If the field device 11 is a two conductor device, for instance, with a 4-20 mA interface, supplementally to the display of the diagnostic report, an error-indicating electrical current can be set via the signal output 16. The field device 11 is connected, for example, with a control station (not shown), which recognizes the error current and initiates appropriate measures. Thus, also at a site remote from the field device 11, the error can be recognized.

The invention claimed is:

1. A measuring system having:
   at least one field device with at least one display apparatus, wherein: said display apparatus is embodied for displaying data, information and diagnostic reports of said field device;
   said field device is supplied with voltage via a voltage input;
   a monitoring system is provided, which monitors the voltage at said voltage input and recognizes a voltage reduction; and
   said field device is embodied to execute a service program, which performs steps to shut down said field device in the case of a detected voltage reduction; and
   said service program is embodied, in the case of a detected voltage reduction, to show on said display apparatus a diagnostic report, which describes the state of said field device; wherein:
   the field device includes at least one signal output and the service program is embodied, in the case of a detected voltage reduction, to output an error signal on said signal output.

2. The measuring system as claimed in claim 1, wherein: said field device is an actuator, sensor or measurement transmitter.

3. The measuring system as claimed in claim 1, wherein: said field device is a multi-parameter field device.

4. The measuring system as claimed in claim 1, wherein: said display apparatus is mounted on said field device.

5. The measuring system as claimed in claim 1, wherein: said display apparatus is embodied as a computer, laptop, handheld, smart phone or tablet-PC.

6. The measuring system as claimed in claim 1, wherein the error signal is an error current.

7. A method for operating a measuring system, having: at least one field device with at least one display apparatus, wherein: said display apparatus is embodied for displaying data, information and diagnostic reports of said field device; said field device is supplied with voltage via a voltage input; a monitoring system is provided, which monitors the voltage at said voltage input and recognizes a voltage reduction; and said field device is embodied to execute a service program, which performs steps to shut down said field device in the case of a detected voltage reduction; and said service program is embodied, in the case of a detected voltage reduction, to show on said display apparatus a diagnostic report, which describes the state of said field device, the method comprising the steps of:
   detecting the voltage reduction at the voltage input;
   performing steps for shut down of the field device in response to the voltage reduction;
   displaying the diagnostic report, which describes the state of the field device; and
   outputting an error signal in the form of an error current to a signal output of the field device.

\* \* \* \* \*